United States Patent
Bradley et al.

(10) Patent No.: US 7,772,531 B2
(45) Date of Patent: Aug. 10, 2010

(54) ADAPTIVE OPTICS BASED SYSTEM AND METHOD TO GENERATE AND CONTROL MULTIPLE OPTICAL BEAMS FOR TRAPPING AND MANIPULATING SMALL PARTICLES

(75) Inventors: Colin Bradley, Victoria (CA); Rodolphe Conan, Victoria (CA)

(73) Assignee: University of Victoria Innovation and Development Corporation, Victoria, BC (CA)

( * ) Notice: Subject to any disclaimer, the term of this patent is extended or adjusted under 35 U.S.C. 154(b) by 4 days.

(21) Appl. No.: 11/977,994

(22) Filed: Oct. 25, 2007

(65) Prior Publication Data

US 2009/0108172 A1   Apr. 30, 2009

(51) Int. Cl.
    *H01S 3/00*    (2006.01)
    *G01J 1/20*    (2006.01)
(52) U.S. Cl. .................................. 250/201.9; 250/251
(58) Field of Classification Search .............. 250/201.9, 250/251, 222.1, 222.2, 234, 216; 356/210, 356/512–515, 520, 521; 359/290–292, 296, 359/238
See application file for complete search history.

(56) References Cited

U.S. PATENT DOCUMENTS

| | | | | |
|---|---|---|---|---|
| 5,026,977 A | * | 6/1991 | Hubbard, Jr. .............. | 250/201.9 |
| 5,229,889 A | * | 7/1993 | Kittell ........................ | 359/849 |
| 5,608,519 A | * | 3/1997 | Gourley et al. .............. | 356/318 |
| 7,137,574 B2 | | 11/2006 | Grier et al. | |
| 2002/0097376 A1 | * | 7/2002 | Applegate et al. ........... | 351/205 |
| 2004/0089798 A1 | * | 5/2004 | Gruber et al. ............... | 250/251 |
| 2004/0207922 A1 | * | 10/2004 | Grier et al. .................. | 359/614 |
| 2005/0001063 A1 | | 1/2005 | Grier et al. | |

OTHER PUBLICATIONS

Voycheck, Carrie "Aberration Correction Using Adaptive Optics in an Optical Trap", Spring 2006, jur.rochester.edu.*
Rodrigo, Eriksen, Daria, and Gluckstand, "Shack-Hartmann multiple-beam optical tweezers" 2003 Optical Society of America.*

* cited by examiner

*Primary Examiner*—Thanh X Luu
*Assistant Examiner*—Jennifer Bennett
(74) *Attorney, Agent, or Firm*—Klarquist Sparkman, LLP (57) ABSTRACT

A combination for use in optical trapping is provided, comprising, in series: an adaptable reflective optical element for sculpting a laser beam to produce a sculpted beam; a beam splitter for splitting the sculpted beam into a first and a second sculpted beam; a micro lens array for dividing the first sculpted beam into an array of beamlets to produce a plurality of focal points; relay optics; and a focusing lens; and, in parallel: a wavefront curvature sensing device for accepting and analyzing the second sculpted beam, and reporting to a computer.

23 Claims, 8 Drawing Sheets

ADAPTIVE OPTICS BASED SYSTEM AND METHOD TO GENERATE AND CONTROL MULTIPLE OPTICAL BEAMS FOR TRAPPING AND MANIPULATING SMALL PARTICLES

FIELD

The present technology is directed to optical tweezers and use thereof. More specifically, the technology is directed to optical tweezers that permit real-time control.

BACKGROUND

An optical trap is an optical tool that utilizes the gradient forces of a focused beam of light to manipulate particles with dielectric constants higher than a surrounding media. To minimize energy, the particles move to where an electric field is the strongest.

Optical trapping is used to manipulate particles, such as cells and nucleic acids. Trapped particles are typically suspended in a fluid medium. The fluid can create unwanted optical aberrations in the optical path and degrade performance.

There are a number of different approaches used for creating optical traps. In one approach, a single laser beam is focused to create one optical trap. The beam remains stationary and a device used to hold the particles, such as a microscope slide, is mechanically moved. In this technique, the optical system is static and any movement is made through mechanical means such as a precise motorized stage. Only a single trap can be created with this approach.

In another approach, a single laser beam is focused to create one optical trap and the trap is moved in two dimensions by means of a scanning mirror. For example, the mirror can be moved at a high speed by two actuators under computer control. A single particle can be trapped and then moved by the scanning system. Furthermore, multiple particles (typically up to 8 effectively) can be trapped by rapidly scanning the laser beam between the trapped particles. Essentially, rapidly moving the beam using the scanning mirror results in "time sharing" of one laser beam over multiple particles. Only a single trap can be created with this approach.

In yet another approach, multiple laser beams are created using a spatial light modulator (SLM). The multiple beams can then be controlled by the SLM. The SLM is composed of cells, each of which can be addressed electronically from the computer. The computer can then control the refractive index of each cell which in turn controls properties of each beam. Using this approach, multiple particles can be trapped and individually controlled. However, this method is indirect and typically requires a complex and relatively slow algorithm to compute trap positions.

Grier et al (U.S. Publication No. 2005/0001063) disclose a method and apparatus for laterally deflecting and separating a flow of particles using a static array of optical tweezers. While the beam can be controlled, control is not done in real-time.

It is an object of the present technology to address deficiencies in the prior art and to provide other advantages.

SUMMARY

The present technology is a multiple beam system for optical trapping. Multiple optical traps are created that are individually controllable by a computer. The disclosed method provides direct real time control of each trap through combination of deformable mirror motion and Shack Hartmann Wave-Front Sensor (SHWFS) data. Therefore, particles can be moved at a high speed, thereby permitting analyses where real-time control is advantageous or required such as cell sorting and manipulation of micro-devices (pumps and valves). Further, the technology provides for a greater degree of beam control thereby allowing more sophisticated control of each individual trap.

In one embodiment, a combination for use in optical trapping is provided, the combination comprising, in series: an adaptable reflective optical element for sculpting a laser beam to produce a sculpted beam; a beam splitter for splitting the sculpted beam into a first and a second sculpted beam; a micro lens array for dividing the first sculpted beam into an array of beamlets to produce a plurality of focal points; relay optics; and a focusing lens; and, in parallel: a wavefront curvature sensing device for accepting and analyzing the second sculpted beam and reporting to a computer.

In one aspect of the embodiment, the wavefront curvature sensing device is a Shack Hartmann Wave-front Sensor.

In another aspect, the adaptable reflective optical element comprises a reflective, dynamic surface and actuators.

In another aspect, the adaptable reflective optical element is a deformable mirror.

In another aspect, the focusing lens is an objective lens.

In another aspect, the objective lens has a numerical aperture greater than unity.

In another aspect, the focusing lens forms an array of high gradient optical regions.

In another aspect, there are at least four actuators per optical trap.

In another aspect, there are five actuators per optical trap.

In another aspect, at least four actuators are configured to manipulate positions of each region of the array of high gradient optical regions.

In another aspect, five actuators are configured to manipulate the positions of each region of the array of high gradient optical regions.

In another aspect, the combination further comprises a second beam splitter and a real-time visual monitor.

In another aspect, the real-time visual monitor is a video monitor.

In another aspect, the wavefront curvature sensing device is an interferometer.

In another aspect, the adaptable reflective optical element is a spatial light modulator.

In a second embodiment, a method for real time optical trapping is provided. The method comprising:

sculpting an incident laser beam;

splitting a resulting sculpted laser beam into a first sculpted beam and a second sculpted beam;

subdividing the first sculpted beam into a plurality of beamlets;

transferring and focusing said beamlets to produce a plurality of focal points;

concomitantly accepting and analyzing the second sculpted beam;

reporting information to a controller; and moving the focal points by resculpting said incident laser beam on the basis of instructions from said controller, thereby optically trapping at least one particle in real time.

In one aspect, the sculpting is effected by at least four actuators per optical trap.

In another aspect, the sculpting is effected by five actuators per optical trap.

DETAILED DESCRIPTION

Figure 1:
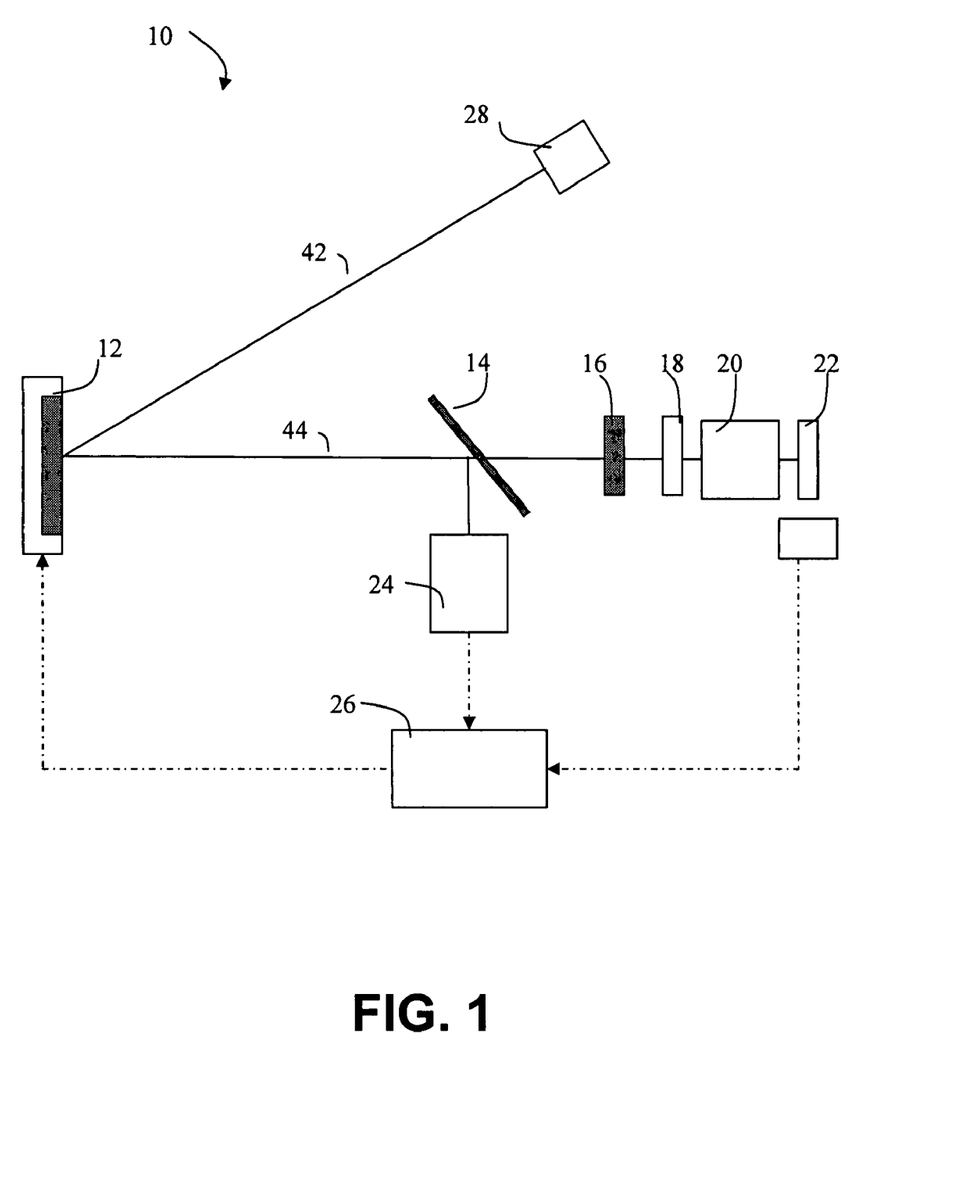
FIG. 1 is a schematic of an embodiment of a system for generating multiple moveable optical traps for manipulating small particles in accordance with the disclosed technology.

A system for creating an optical trap, generally referred to as 10, is shown in FIG. 1. The system 10 includes an adaptable reflective optical element 12 such as a deformable mirror situated upstream from a beam splitter 14, a micro lens array (MLA) 16, relay optics 18, and focusing optics 20. Focusing optics 20 is typically an objective lens with a very high numerical aperture (NA), typically greater than unity. A transparent vessel 22 for containing a sample is located downstream from the focusing optics 20 in the system 10. On a second path, a wavefront curvature sensing device 24 such as a Shack Hartmann Wave-Front Sensor (SHWFS) is located downstream from the beam splitter 14 and upstream from a computer 26. The light source for the system 10 is a laser 28. Any suitable laser can be used. Useful lasers include, but are not limited to, solid state lasers, diode pumped lasers, gas lasers, dye lasers, alexanderite lasers, free electron lasers, VCSEL lasers, diode lasers, Ti-Sapphire lasers, doped YAG lasers, doped YLF lasers, diode pumped YAG lasers, and flash lamp-pumped YAG lasers. Diode-pumped Nd:YAG lasers operating between 10 mW and 10 W are preferred.

Figure 2:
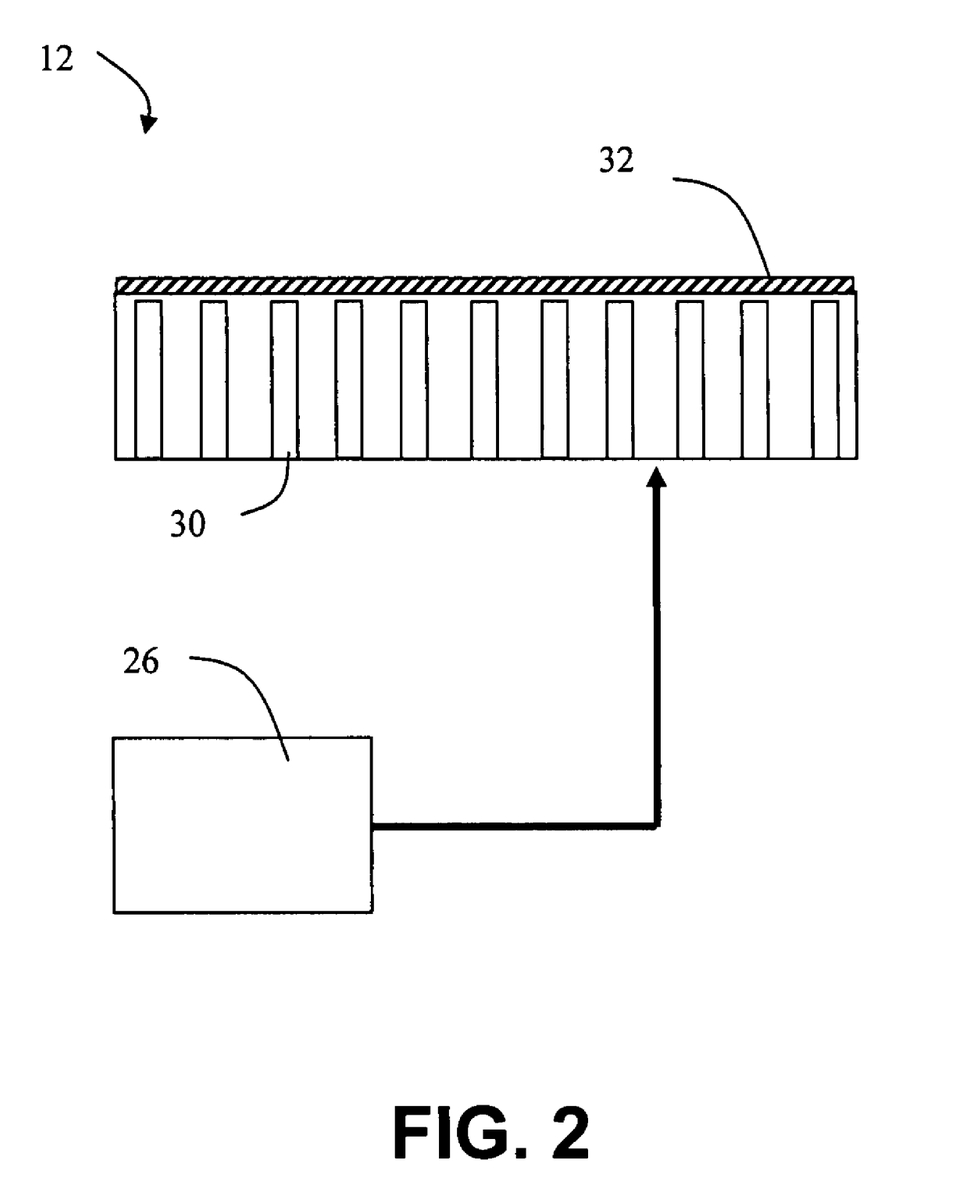
FIG. 2 is an exemplary deformable mirror of the technology of FIG. 1.

FIG. 2 shows a cross-sectional view of a deformable mirror 12. The deformable mirror 12 is an exemplary adaptable reflective optical element that can be used in system 10. The deformable mirror 12 has an array of actuators 30 positioned beneath a reflective, dynamic surface 32 and the actuators 30 are under control of a computer 26. The computer 26 can address each actuator 30 and precisely control its length. Therefore, as the computer 26 addresses each actuator 30, their length changes. In this manner, motions of the actuators 30 alter the shape of the reflective, dynamic surface 32. Therefore, the entire shape of the reflective, dynamic surface 32 can be changed. An exemplary deformable mirror device is a phase only deformable mirror such as the "multi-DM" manufactured by Boston Micromachines of the USA or the "mirao" manufactured by Imagine Eyes of France. Another exemplary adaptable reflective optical element is Texas Instruments digital light processor (DLP) employing micromirrors. These dynamic optical devices have an encodable reflective surface in which a computer sculpts the wave-front surface formed therein.

Figure 3:
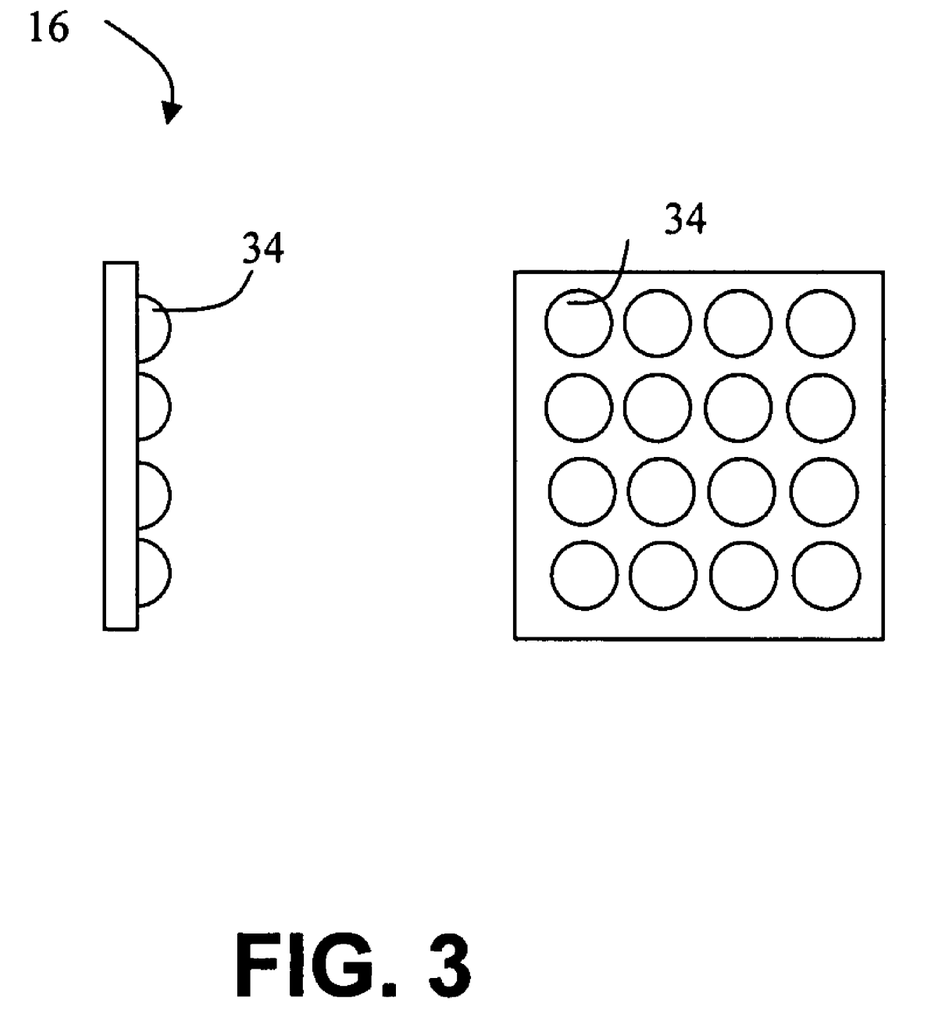
FIG. 3 is an exemplary micro lens array (MLA) of the technology of FIG. 1.

FIG. 3 shows an exemplary MLA 16 that can be used in system 10. MLA 16 includes an array of micro-lenses 34. The micro-lenses 34 of the MLA (called lenslets 34) typically all have the same focal length.

Figure 4:
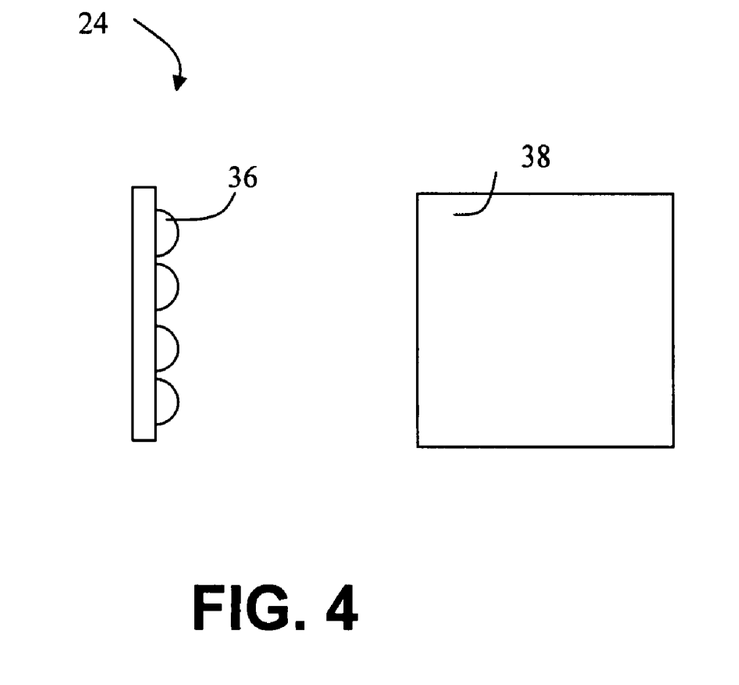
FIG. 4 is a Shack Hartmann Wave-Front Sensor, which is an exemplary wavefront curvature sensing device of the technology of FIG. 1.

FIG. 4 is a side perspective and a front perspective view of a SHWFS 24. The SHWFS 24 is an exemplary wavefront curvature sensing device that can be used in system 10. The SHWFS 24 has an array of micro-lenses 36 positioned in front of a digital imaging camera 38. The SHWFS 24 can be used for measuring a phase profile of a wavefront such as a wavefront generated by an adaptable reflective optical element (e.g., deformable mirror 12).

Figure 5:
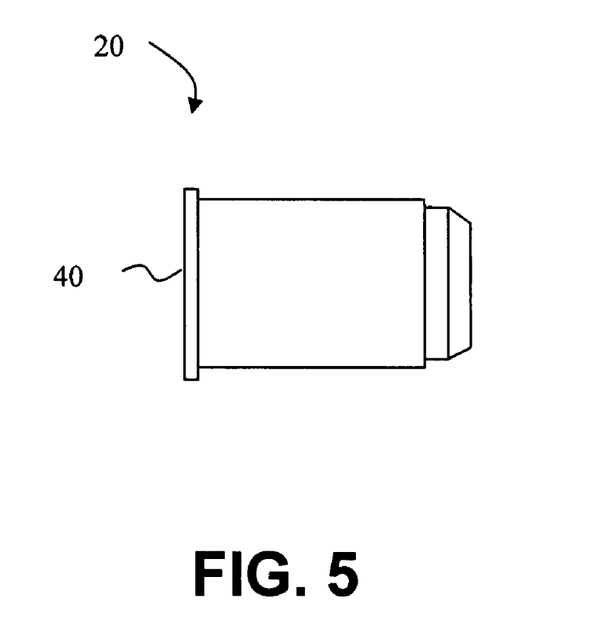
FIG. 5 is an objective lens, which is exemplary focusing optics of the technology of FIG. 1.

FIG. 5 is a side-view of an objective lens 20. The objective lens 20 is an example of focusing optics that can be used in system 10. The objective lens 20 has a back aperture 40.

With regard to FIG. 1, operation of the system 10 using the exemplary devices shown in FIGS. 2-5 can be described as follows. A laser beam 42 is directed off a deformable mirror 12, which is positioned in a plane conjugate to the planar surface at the back aperture 40 of the objective lens 20 (see FIG. 5). The laser beam 42 can be described as having a wavefront with a phase profile. The wavefront of the laser beam 42 is sculpted by the deformable mirror 12 by changing the phase profile, thereby forming a sculpted laser beam 44 that is then directed to the beam splitter 14.

Figure 6:
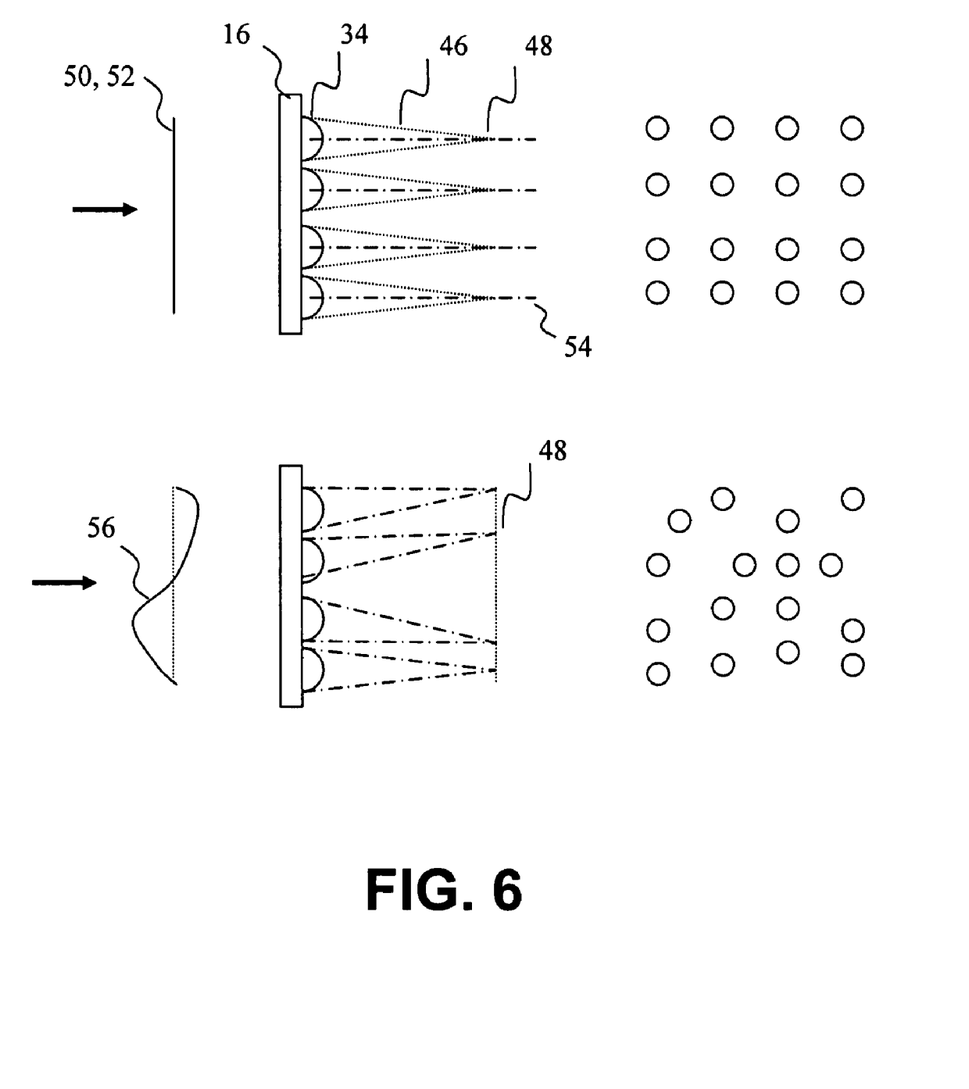
FIG. 6 is a schematic illustrating creation of optical traps by a micro lens array and movement of each trap to a new position, the new position based on a sculpted wavefront of the laser beam formed by a deformable mirror and received by the micro lens array.

The beam splitter 14 transmits a portion of the sculpted beam 44, thereby forming a first sculpted beam, to the MLA 16. The MLA 16 can be a static optical element that takes the incoming first sculpted laser beam and subdivides it into an array of smaller optical beams termed beamlets. FIG. 6 is an illustration of micro-lenses 34 of an MLA 16 forming beamlets 46. The number and spacing of the beamlets 46 is dependent on the number of MLA micro-lenses 34 in the MLA 16. Each of the beamlets 46 is brought to a focus at a focal point 48 behind or downstream of the MLA 16. Positions of focal points 48 are determined by focal lengths of the MLA micro-lenses 34. An adaptable reflective optical element upstream from the MLA 16 can control the positions of the focal points 48 of each beamlet 46 by adjusting the wavefront of the sculpted laser beam that is incident on the MLA 16. For example, in system 10, a deformable mirror 12 can be used to adjust or sculpt the wavefront of the laser beam 42 to form a sculpted wavefront 44 that is received by the MLA 16. In this manner, the deformable mirror 12 can directly control both the motion and the positions of the focal points 48 of the MLA 16 by adapting the reflective dynamic surface 32 of the deformable mirror 12.

The sculpting by the deformable mirror 12 individually or collectively can move the focal points 48 to a desired set of new spatial positions. As shown in FIG. 6, if a plane wave 50 with an unsculpted wavefront phase 52 is received by the MLA 16 then each beamlet 46 is brought to a focus on the axis 54 of each MLA micro lens 34. If the wavefront phase 56 has been adjusted by a deformable mirror, (i.e., a sculpted wavefront phase 56) then the positions of the focal points 48 can be offset from the MLA micro lens axis 54. The degree to which focal points 48 can be offset from the axis 54 is based on the curvature of the sculpted wavefront 56. For example, in system 10, the shape of a deformable mirror reflective dynamic surface 32 of deformable mirror 12 imparts a sculpted wavefront 56 onto the laser beam 42 thereby forming sculpted beam 44. The sculpted wavefront 56 in turn dictates the positions of the beamlet focal points 48 in a plane behind the MLA, the motion of optical traps in the direction of the beam, and clockwise or counter-clockwise rotation of the traps in the plane.

In system 10, an array of focal points 48 of the MLA 16 (FIG. 6) is transferred by relay optics 18 to the back aperture 40 of the objective lens 20 (FIG. 5). The focal points 48 are relayed and focused into a vessel 22 by the objective lens 20. The vessel 22 includes particles to be captured. The objective lens 20 focuses beamlets formed by the MLA 16, such as beamlets 46, in a high gradient optical region that is capable of trapping particles. The vessel 22 is constructed of transparent material, to allow the beamlets 46 to pass through and to reduce interference with the formation of the optical traps.

In FIG. 1, a portion of the sculpted laser beam 44 is also directed by the beam splitter 14 into a wavefront curvature sensing device 24 such as an exemplary Shack Hartmann Wave-Front Sensor (SHWFS) 24, thereby forming a second sculpted beam. The SHWFS 24 is configured to measure the phase of the wavefront generated by the deformable mirror 12. Wavefront phase information is then transmitted to the computer 26 where the information is utilized by control software.

Figure 7:
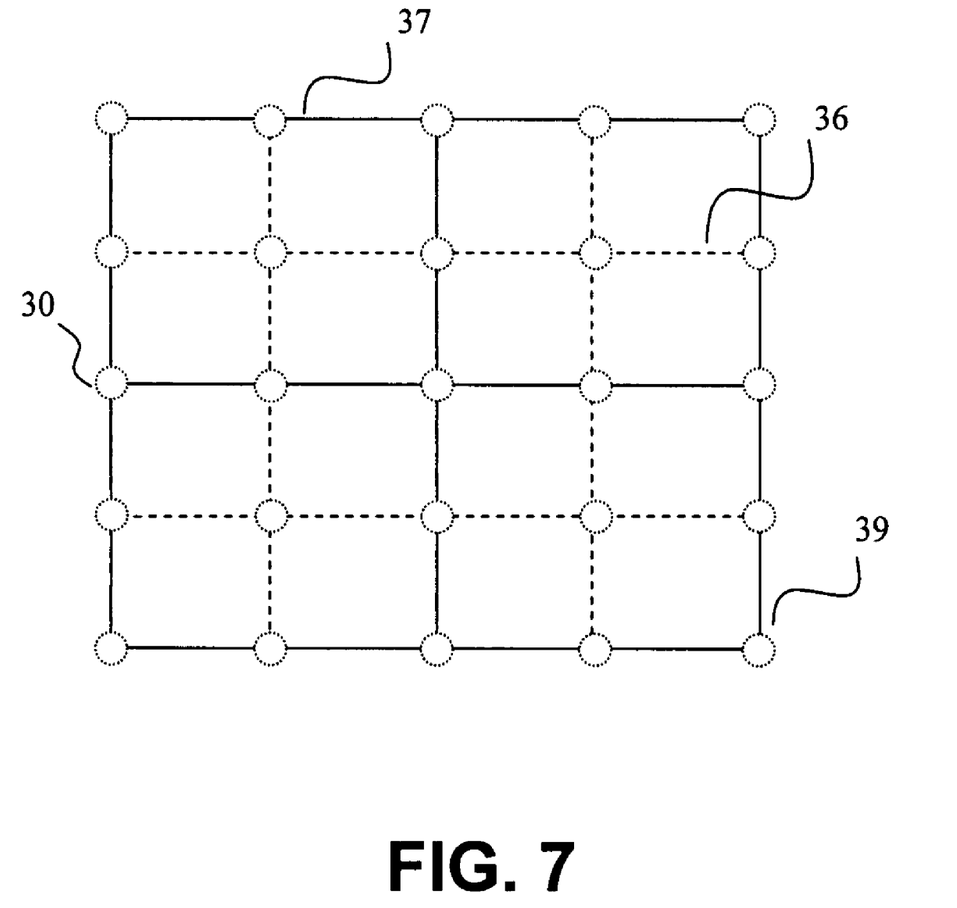
FIG. 7 is a schematic illustrating registration between a micro lens array used to create optical traps, a Shack Hartmann Wave-Front Sensor micro lens array, and actuators of a deformable mirror of the disclosed technology.

For fine control and manipulation of trapped particles, the SHWFS 24 can have more wavefront sample points than the number of optical traps created by the MLA 16. As shown in FIG. 7, the SHWFS micro-lens array 36 can be registered to the actuators 30 of the deformable mirror 12 at the corners of the SHWFS micro lens array 36. This registration allows precise motion of the optical traps 37 and also the ability to apply specific modes to each of the beamlets 46 in the traps, such as defocus or helical modes. For clarity, only four optical traps 37 are shown in FIG. 7, but it should be understood that a larger array of such optical traps can be created by the MLA 16.

The number of actuators 30 per optical trap 37 is related to the number of degrees of freedom of an optical trap. For example, four actuators 30 per optical trap provide control of the optical trap motion in a plane; five actuators 30 per optical trap are needed to change the optical trap depth. The number of lenses 36 in the SHWFS micro lens array 24 is directly related to the number of actuators 30, because the registration of the actuators 30 and the SHWFS lenses 36 is preferably done such that the actuators 30 are at the corners 39 of the SHWFS lenses 36.

The number of optical traps 37 is given by the number of lenses 34 in the MLA 16, the number of actuators 30 is given by the number of degrees of freedom of the optical traps, and the number of lenses 36 of the SHWFS 24 is given by the registration between the SHWFS 24 and the deformable mirror 12.

The number of actuators 30 is dependent on the deformable mirror 12 design and on the mirror manufacturer. For example, deformable mirrors made by Boston Micro Machines can have 140 actuators. Other deformable mirrors include 1024 actuators. The number of lenses 36 in the SHWFS micro-lens array 24 is also a function of design. If the SHWFS micro-lens array 24 has more lenses than the MLA 16, oversampling of the wavefront shape after it leaves the deformable mirror 12 is possible.

Figure 8:
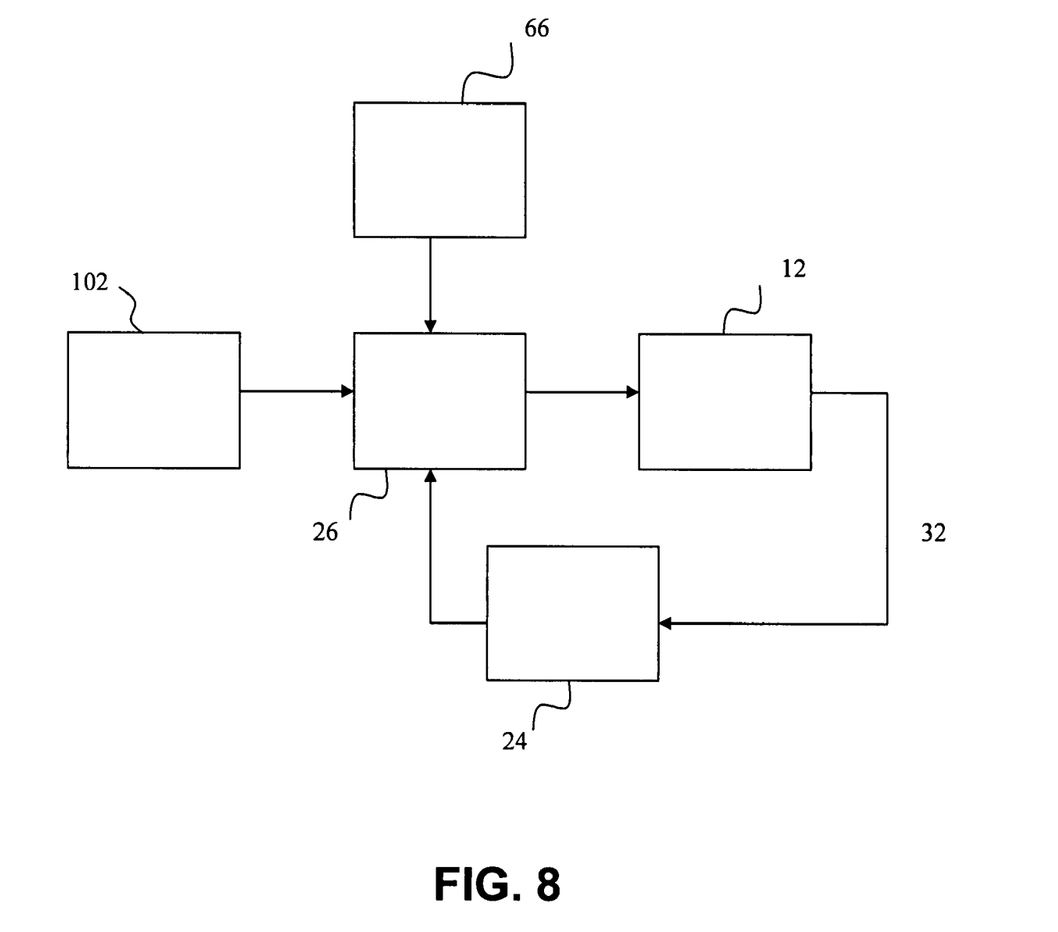
FIG. 8 is a flowchart showing how computer software can control the system.

FIG. 8 is a flowchart showing how the system 10 can be controlled. To trap small particles, an operator 102 and/or the computer 26 adjust the deformable mirror 12 to direct the movement of each optical trap to acquire a selected small particle and trap it. A video camera system 66 can observe the position of the traps. The plurality of optical traps containing particles can then be configured and reconfigured. Using the video camera data, the position and identity of one or more of the trapped particles can be monitored. Control software can be employed to accept SHWFS data and to determine the shape of the reflective, dynamic surface 32 of deformable mirror 12. The operator 102 can determine desired positions for the optical traps either manually or through a computer-based algorithm. The control software then utilizes the determined information, the SHWFS data, and current positions of the optical traps to compute shapes of the reflective, dynamic surface 32 for moving the traps to the desired positions.

Figure 9:
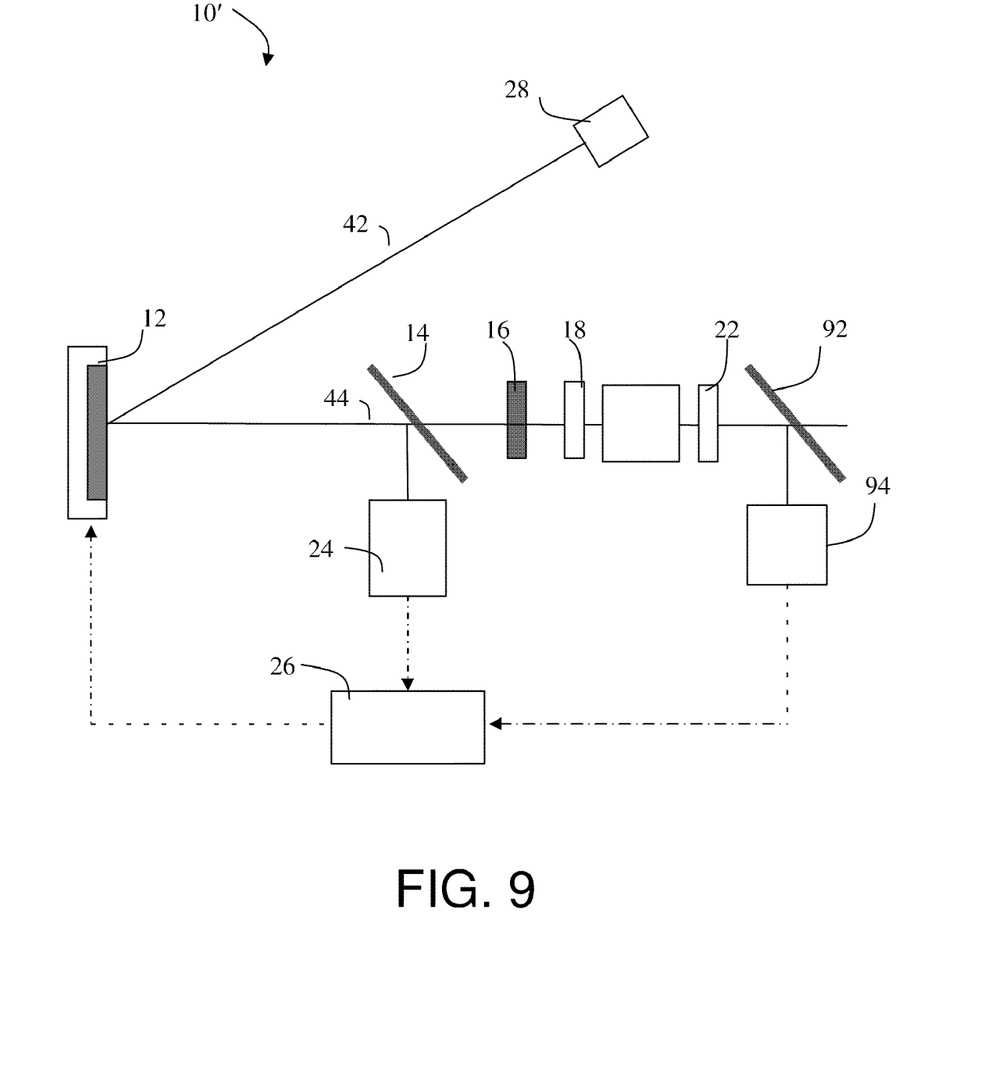
FIG. 9 is a schematic of another embodiment of a system for generating multiple moveable optical traps for manipulating small particles in accordance with the disclosed technology.

The foregoing are embodiments of the disclosed technology. As would be known to one skilled in the art, variations that do not alter the scope of the technology are contemplated. For example, suitable adaptable reflective optical elements having a time dependent aspect to their function include, but are not limited to, variable computer generated diffractive patterns, variable phase shifting materials, variable liquid crystal phase shifting arrays, micro-mirror arrays, piston mode micro-mirror arrays, spatial light modulators, electro-optic deflectors, acousto-optic modulators, deformable minors, reflective MEMS arrays. Through use of a dynamic phase patterning optical element, the features of a surface can be encoded to form a hologram and altered such as by a computer to effect a change in the hologram which can in turn affect the number of beamlets, the phase profile of at least one of the beamlets, and the location of at least one of the beamlets. The video camera system can be replaced with any suitable real time visual monitor. The SHWFS could be replaced with, for example, but not limited to, an interferometer or any suitable wavefront curvature sensing device. The deformable minor could be replaced with, for example, but not limited to a spatial light modulator (SLM). The particles can be contained in, for example, but not limited to, a fluid medium that is held in a small cavity created between two microscope slides. The system can further comprise a second beam splitter. FIG. 9, for example, illustrates a system 10' with a second beam splitter 92 and a real-time visual monitor 94.

Aspects of the disclosed technology, such as selective generation and control of an optical tweezer system, may be useful in a variety of commercial applications, such as, optical circuit design and manufacturing, nanocomposite material construction, fabrication of electronic components, opto-electronics, chemical and biological sensor arrays, assembly of holographic data storage matrices, rotational motor, mesoscale or nanoscale pumping, energy source or optical motor to drive a micro electrical mechanical system (MEMS), facilitation of combinatorial chemistry, promotion of colloidal self-assembly, manipulation of biological materials, interrogating biological material, concentrating selected biological material, investigating the nature of biological material, and examining biological material.

In view of the many possible embodiments to which the disclosed principles may be applied, it should be recognized that the illustrated embodiments are only examples and should not be taken as limiting in scope. Rather, the scope is defined by the following claims. We therefore claim all that comes within the scope and spirit of these claims.

We claim:

1. A combination for use in optical trapping, said combination comprising: an adaptable reflective optical element configured to sculpt a laser beam to produce a sculpted beam; a beam splitter configured to split said sculpted beam into a first sculpted beam portion and a second sculpted beam portion; a micro-lens array configured to divide said first sculpted beam portion into an array of beamlets and produce a plurality of beamlet focal points; relay optics configured to relay the array of beamlets; a focusing lens configured to receive the relayed array of beamlets and to form at least one optical trap; and a wavefront curvature sensing device configured to accept and analyze the second sculpted beam portion and report to a computer to manipulate the at least one optical trap.

2. The combination of claim 1, wherein the wavefront curvature sensing device comprises a Shack Hartmann Wave-Front Sensor.

3. The combination of claim 1, wherein said adaptable reflective optical element comprises a reflective, dynamic surface and a plurality of actuators.

4. The combination of claim 3, wherein said adaptable reflective optical element comprises a deformable mirror.

5. The combination of claim 1, wherein said focusing lens comprises an objective lens.

6. The combination of claim 5, wherein the objective lens has numerical aperture greater than unity.

7. The combination of claim 3, wherein at least four actuators are registered to each optical trap.

8. The combination of claim 7, wherein five actuators are registered to each optical trap.

9. The combination of claim 6, further comprising a second beam splitter and a visual monitor.

10. The combination of claim 9, wherein said visual monitor comprises a video monitor.

11. The combination of claim 1, wherein the wavefront curvature sensing device is an interferometer.

12. The combination of claim 11, wherein the adaptable reflective optical element comprises a spatial light modulator.

13. A method for real time optical trapping, comprising:
sculpting a laser beam thereby forming a sculpted laser beam;
splitting the sculpted laser beam into a first sculpted beam and a second sculpted beam;
subdividing said first sculpted beam into a plurality of beamlets;
transferring and focusing said beamlets to produce a plurality of focal points;
analyzing said second sculpted beam;
reporting results of said analyzing said sculpted beam to a controller;
generating, by the controller, instructions based on said reported results of said analyzing said sculpted beam; and
moving at least one of said plurality of focal points by resculpting said laser beam based on said instructions from said controller, thereby optically trapping at least one particle in real time.

14. The method of claim 13, wherein said sculpting is effected by at least four actuators per optical trap.

15. The method of claim 13 wherein said sculpting is effected by five actuators per optical trap.

16. An apparatus, comprising: an adaptable optical element configured to receive a laser beam and to modify a phase profile of the laser beam thereby producing a modified beam; a beam splitter configured to split said modified beam into a first modified beam portion and a second modified beam portion; a plurality of lenses situated to generate a respective plurality of beamlets from the first modified beam portion; a focusing optical element configured to receive the plurality of beamlets and to form a plurality of trapping regions; a wavefront curvature sensor configured to receive and analyze the second modified beam portion; and a control system configured to control the adaptable optical element to manipulate the plurality of trapping regions based on the wavefront curvature sensor analysis.

17. The apparatus of claim 16, wherein the wavefront curvature sensor comprises a Shack Hartmann Wave-Front Sensor.

18. The apparatus of claim 16, wherein the adaptable optical element comprises a plurality of adjustable components each configured to modify respective portions of the phase profile of the laser beam and wherein the control system is further configured to manipulate a position of at least one of the plurality of trapping regions by controlling at least four adjustable components associated with a corresponding portion of the phase profile.

19. The apparatus of claim 16, wherein the control system is configured to manipulate a position of at least one of the trapping regions by controlling five adjustable components associated with a corresponding portion of the phase profile.

20. The apparatus of claim 16, the wavefront curvature sensor comprising a plurality of sensing areas, at least some of the sensing areas being associated by the control system with respective sub-portions of the adaptable optical element to control at least one of the plurality of trapping regions associated with one or more of the respective sub-portions, the adaptable optical element comprising a plurality of actuators, at least some of the plurality of actuators being arranged at one or more corners of the respective sub-portions of the adaptable optical element, and one or more sensing areas of the wavefront sensor being associated by the control system to respective ones of the one or more corners.

21. The apparatus of claim 16, the apparatus being configured to apply one or more modes to one or more of the plurality of trapping regions.

22. The apparatus of claim 21, the one or more modes comprising a defocus mode or a helical mode.

23. The apparatus of claim 16, the wavefront curvature sensor comprising a plurality of sensing areas, at least some of the sensing areas being associated by the control system with respective sub-portions of the adaptable optical element to control at least one of the plurality of trapping regions associated with one or more of the respective sub-portions, and at least some of the respective sub-portions of the adaptable optical element being rectangular sub-portions.

* * * * *